(12) United States Patent
Iwasaki et al.

(10) Patent No.: US 6,880,523 B2
(45) Date of Patent: Apr. 19, 2005

(54) MEASUREMENT OF ENGINE CYLINDER INDUCTION AIR QUANTITY

(75) Inventors: Tetsuya Iwasaki, Tokyo (JP); Shouichi Hayase, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/342,339

(22) Filed: Jan. 15, 2003

(65) Prior Publication Data

US 2004/0231640 A1 Nov. 25, 2004

(30) Foreign Application Priority Data

Jan. 18, 2002 (JP) ........................................ 2002-010289

(51) Int. Cl.[7] .............................................. F02D 41/00
(52) U.S. Cl. ............................ 123/339.12; 123/339.14; 123/184.46
(58) Field of Search .................... 123/339.1, 339.12, 123/339.14, 344, 184.21, 184.46

(56) References Cited

U.S. PATENT DOCUMENTS 3,877,449 A * 4/1975 High ....................... 123/339.1
4,492,195 A * 1/1985 Takahashi et al. ..... 123/339.11
6,328,007 B1 12/2001 Hirasawa et al.

FOREIGN PATENT DOCUMENTS

| JP | 2001-50091 A | 2/2001 |
| JP | 2002-257841 A | 9/2002 |
| WO | WO 02/070994 A2 | 9/2002 |

OTHER PUBLICATIONS

U.S. Appl. No. 10/342,340 filed Jan. 15, 2003, Iwasaki et al.

* cited by examiner

*Primary Examiner*—Bibhu Mohanty
(74) *Attorney, Agent, or Firm*—Foley & Lardner LLP

(57) ABSTRACT

An engine cylinder induction air quantity measuring apparatus includes a controller to calculate an intake manifold inside air quantity of air in an intake manifold of the engine, from a sensed intake air quantity by performing a balance calculation to calculate a balance between an intake manifold inflow air quantity of air flowing into the intake manifold, and an intake manifold outflow air quantity of air flowing out of the intake manifold. In an engine stopping process to stop the engine, the controller controls a throttle opening of a throttle valve to a predetermined stop mode opening greater than an idling mode opening for an idle operation of the engine.

16 Claims, 8 Drawing Sheets

MEASUREMENT OF ENGINE CYLINDER INDUCTION AIR QUANTITY

BACKGROUND OF THE INVENTION

The present invention relates to technique of measuring a quantity of air inducted into a cylinder section of an engine in accordance with a quantity of air inside an intake manifold determined by a balance calculation between an inflowing air quantity and an outflowing air quantity. In particular, the present invention relates to such engine cylinder induction air quantity measurement adapted to improve the accuracy of the air quantity measurement.

United States Patent U.S. Pat. No. 6,328,007 B1 (corresponding to Published Japanese Patent application Kokai No. 2001-50091) shows a process of balance calculation between the inflowing and outflowing air quantities to determine an intake manifold inside air quantity, and to calculate an engine cylinder induction air quantity in accordance with the manifold inside air quantity and a cylinder volume. The thus-calculated engine cylinder induction air quantity is used to calculate a fuel injection quantity to achieve a desired air fuel ratio.

SUMMARY OF THE INVENTION

In an engine stopping process (including a temporary stop for an idle stop control), the balance calculation process is continued to determine the cylinder induction quantity for use as an initial value for a next engine start, until a predetermined final engine stop condition is reached. In one example, the balance calculation is continued until the pressure in the intake manifold becomes equal to the ambient pressure.

However, an air flowmeter in general becomes lower in the sensing accuracy in a low flow rate region, and accordingly causes errors in the balance calculation of the manifold inside air quantity in an engine stopping process. During the process of stopping an engine, the throttle valve is held at a minimum setting for sustaining an idling operation of the engine, so that air is introduced into the intake manifold at a low flow rate. This scanty air flow through the throttle valve tends to deteriorate the accuracy of the air flowmeter, and hence cause errors in the balance calculation.

Moreover, in an engine provided with a valve overlap in which the opening periods of the intake and exhaust valves are overlapped, at or near the exhaust top dead center, the engine can stop at a position within the valve overlap. In this case, air is drawn into the intake manifold from the exhaust side, too. This back flow from the exhaust side tends to deteriorate the accuracy of the balance calculation.

The final value reached by the balance calculation of the manifold inside air quantity in the engine stopping process is used as an initial value of the manifold inside air quantity for determining a fuel injection quantity in a next engine start. From the thus-determined manifold inside air quantity influenced by sensing errors, the engine control system cannot accurately determine the fuel injection quantity to achieve a required air fuel ratio, and therefore might cause an increase of unwanted emissions, and a torque deficiency degrading the performance of engine starting operation.

It is an object of the present invention to provide apparatus and/or method of measuring an engine cylinder induction air quantity more accurately in the process of stopping the engine (including an idle stop).

According to the present invention, an engine cylinder induction air quantity measuring apparatus for an engine provided with a throttle valve which is controlled independently from driver's accelerator operation, comprises: (i) an intake air quantity sensing section to sense an intake air quantity of air drawn into an intake system of the engine; (ii) an intake manifold inside air quantity calculating section to calculate an intake manifold inside air quantity of air in an intake manifold of the engine, from the intake air quantity by performing a balance calculation to calculate a balance between an intake manifold inflow air quantity of air flowing into the intake manifold, and an intake manifold outflow air quantity of air flowing out of the intake manifold; (iii) a cylinder induction air quantity calculating section to calculate a cylinder induction air quantity of air inducted into a cylinder section of the engine in accordance with the intake manifold inside air quantity; and (iv) an engine stop mode throttle controlling section to control a throttle opening of the throttle valve to a predetermined stop mode opening greater than an idling mode opening for an idle operation of the engine, in an engine stopping process to stop the engine.

According to the present invention, an engine cylinder induction air quantity measuring process comprises: calculating an intake manifold inside air quantity, from a sensed intake air quantity of an engine, by performing a balance calculation to calculate a balance between an intake manifold inflow air quantity, and an intake manifold outflow air quantity, and calculating a cylinder induction air quantity from the intake manifold inside air quantity; and controlling a throttle opening of the throttle valve to a predetermined stop mode opening greater than an idling mode opening for an idle operation of the engine, in an engine stopping process to stop the engine.

The other objects and features of this invention will become understood from the following description with reference to the accompanying drawings.

DETAILED DESCRIPTION OF THE INVENTION

Figure 1:
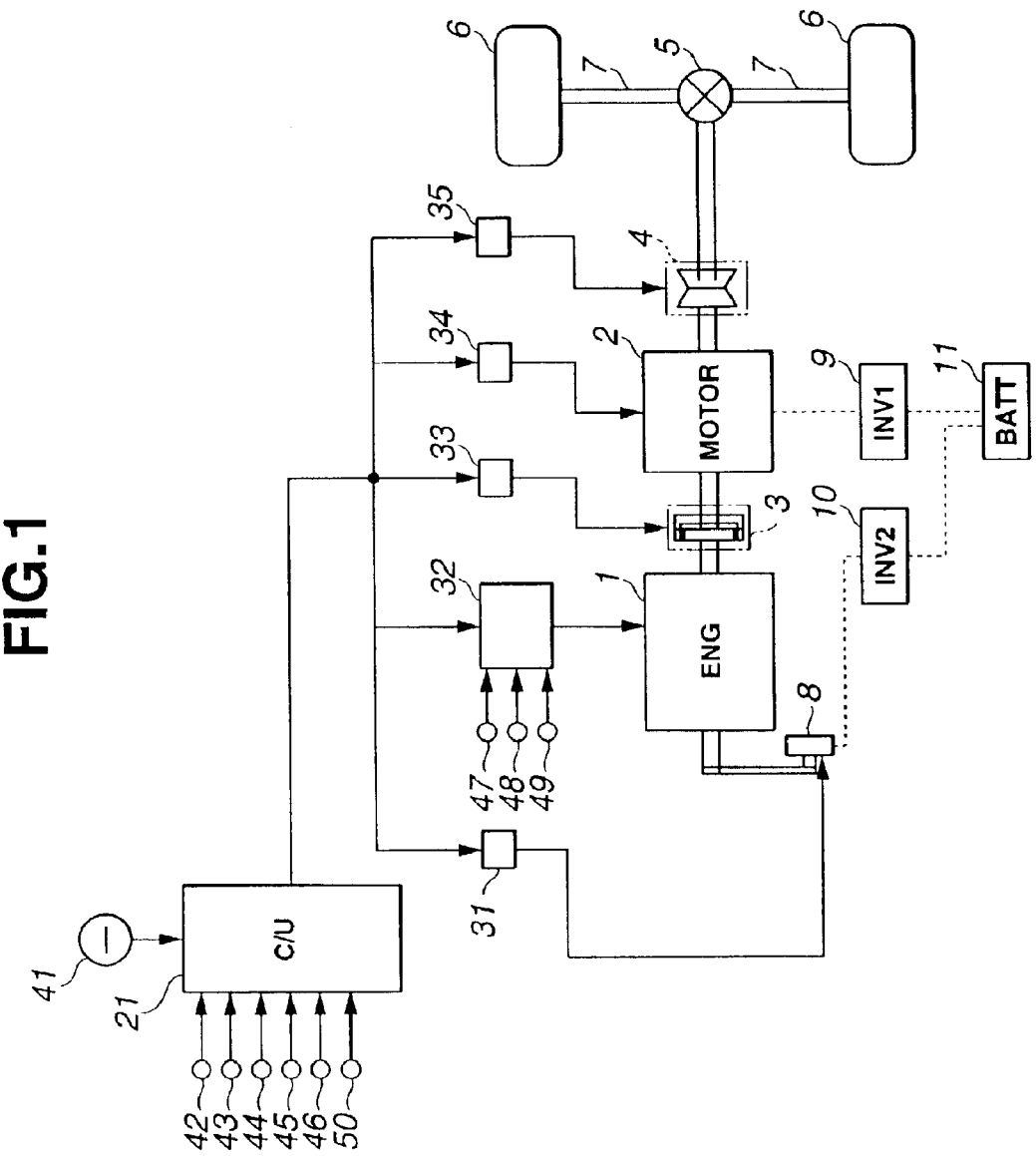
FIG. 1 is a schematic view showing a vehicle control system according to one embodiment of the present invention.

FIG. 1 shows a vehicle control system according to one embodiment of the present invention. A power system of this example is a parallel hybrid system including an engine 1 and a first (traction) electric motor (or motor/generator) 2.

In the power system, the crank shaft of engine 1 is connected with the rotation shaft of first motor 2 through a powder clutch 3. Torque produced by this power unit is transmitted through a transmission 4 and a differential gear unit 5 to left and right drive shafts 7 for left and right drive wheels 6. By engaging and disengaging powder clutch 3, this hybrid system can drive the vehicle only by motor/generator 2, or only by engine 1, or by engine 1 with the supplementary aid of motor/generator 2.

The rotation shaft of a second (cranking) electric motor (or motor/generator) 8 distinct from first motor/generator 2 is connected with the crank shaft of engine 1. Second motor/generator 8 is used for cranking of engine 1 and regenerative power generation. First motor/generator 2 too is capable of regenerating energy. Electric power generated by motor/generators 2 and 8 is stored to a battery 11 (BATT) through respective inverters 9 and 10 (INV1 and INV2). Conversely, power is supplied from battery 11 through inverters 9 and 10 to motor/generators 2 and 8.

The control system of FIG. 1 includes a controller section having a plurality of controllers. A vehicle control unit (or electronic control unit ECU) 21 serves as an upper-level (or superordinate) controller for issuing commands to lower-level controllers of subsystems, and thereby attending to the overall control of the vehicle. In this example, commands are produced in terms of torque because of its universality. Vehicle ECU 21 delivers a motor torque command to a motor controller 31 for controlling motor/generator 8; an engine torque command to an engine controller 32 for controlling engine 1; a clutch transmission torque command to a clutch controller 33 for controlling clutch 3; a motor torque command to a motor controller 34 for controlling traction motor/generator 2; and a transmission torque command (speed ratio command) to a transmission controller 35 for controlling transmission 4. Each of controllers 31~35 controls its controlled system in accordance with the torque command sent from vehicle ECU 21.

A sensor (or input) section of the control system of this example includes the following input devices. A start switch 41 produces an on-off signal representing the on-off state of an ignition switch of the vehicle, and an on signal of a start switch of the vehicle. An accelerator sensor 42 senses a driver's accelerator input or accelerator pedal depression, and produces an accelerator position signal representing a driver's demand. A brake sensor 43 senses a brake pedal depression or a turn-on of a brake switch. A shift sensor 44 senses a current position of a shift lever. Signals from these sensors are supplied to vehicle ECU 21.

Vehicle ECU 21 is supplied with information on various operating conditions from the following sensors: A vehicle speed sensor 45 senses a vehicle speed VSP. A battery sensor 46 senses a state of charge (SOC) of battery 11 (by sensing a discharge current, in this example). A motor speed sensor 50 senses a rotational speed (rpm) NM of second motor/generator 8. These sensors 45, 46 and 50 are connected with vehicle ECU 21. Engine controller 32 is supplied with information on operating conditions from the following sensors. A throttle sensor 47 senses a throttle opening (degree) TVO of engine 1. An air flow meter (or air flow sensor) 48 senses an intake air quantity Qa of engine 1. (The intake air quantity Qa sensed by air flow sensor 48 is also referred to as a throttle passage air quantity, for discrimination from a later-mentioned cylinder induction air quantity.) A crank angle sensor 49 senses the crank angle of engine 1. These sensors 47, 48 and 49 are connected to engine controller 32.

In accordance with input information from various sensors, vehicle ECU 21 calculates torques as commands. If the SOC of battery 11 is at a sufficient level, vehicle ECU 21 employs traction motor/generator 2 as prime mover in a low vehicle speed operation, disengages clutch 3 and stops engine 1. When vehicle speed VSP is increased into a predetermined high speed region according to a driver's acceleration demand, then vehicle ECU 21 shifts the power source to engine 1 by starting engine 1 and engaging clutch 3.

During operation of engine 1, engine controller 32 always ascertains a cylinder induction air quantity of air inducted into the engine cylinder, and calculates a fuel supply quantity (a fuel injection quantity in this example) required to achieve the engine torque dictated by the command, with respect to the cylinder induction air quantity. The cylinder induction air quantity and fuel injection quantity are calculated in the following manner.

Figure 2:
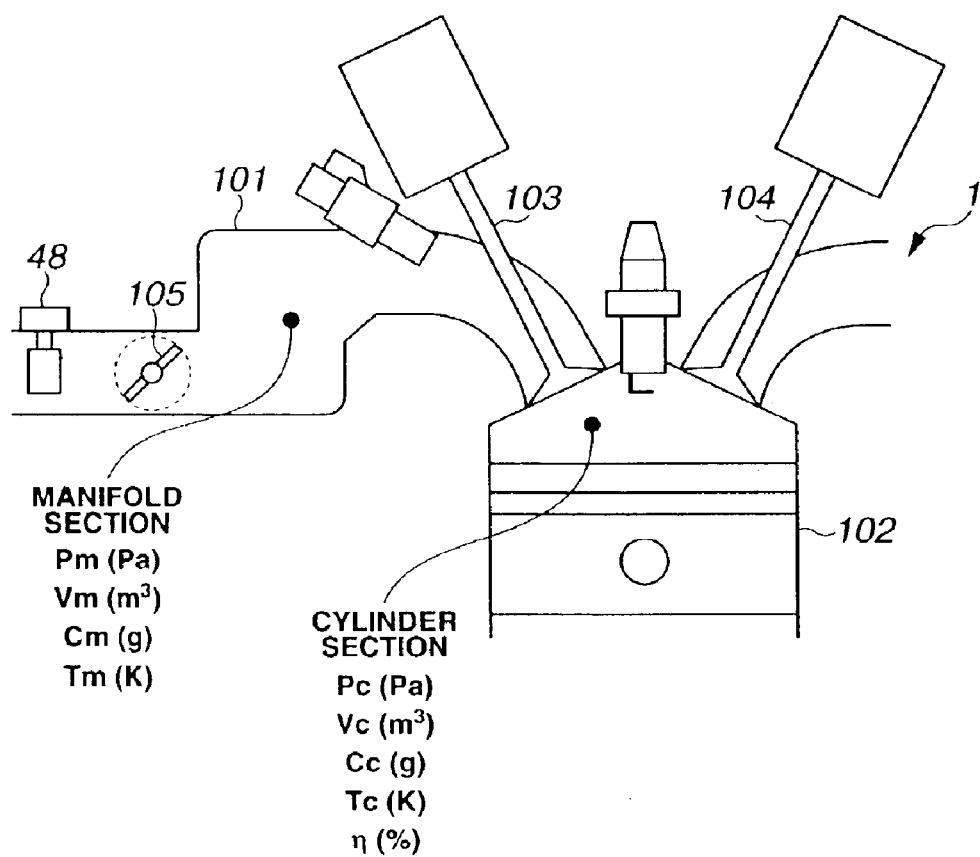
FIG. 2 is a schematic view showing an intake manifold and a cylinder of an engine in the system of FIG. 1, with parameters used for calculating an engine cylinder induction air quantity.

In this example, the cylinder induction air quantity is calculated by a cylinder induction air quantity calculating method disclosed in the before-mentioned United States Patent U.S. Pat. No. 6,328,007 B1 (-Published Japanese Patent application Kokai No. 2001-50091). The disclosure of this patent U.S. Pat. No. 6,328,007 B1 about the calculating method, including FIGS. 1A, 4, 5, 6 and 7 and the related explanations, is herein incorporated by reference. In an intake manifold 101, as shown in FIG. 2, a pressure is Pm [Pa], a volume is Vm [m$^3$, constant], an air mass quantity (the mass of air) is Cm [g], and a temperature is Tm [K]. In an engine cylinder section 102, a pressure is Pc [Pa], a volume is Vc [m$^3$], an air mass quantity (the mass of air) is Cc [g], and a temperature is Tc [K]. An incylinder fresh air rate is η [%]. This incylinder fresh air rate η is varied in correlation with a valve overlap period of an intake valve 103 and an exhaust valve 104. Incylinder fresh air rate η decreases as the valve overlap period elongates and hence the amount of residual burnt gases (internal EGR gases) increases. In this example, it is assumed that Pm=Pc, and Tm=Tc. Thus, the pressure and temperature remain unchanged between intake manifold 101 and engine cylinder section 102. Manifold volume Vm is constant.

First, engine controller 32 calculates the throttle passage air quantity Qa [g/msec] from the output of air flow meter 48. Throttle passage air quantity Qa is a a flow rate of air passing through throttle valve 105. Engine controller 32 further calculates a manifold inflow air quantity Qa (the mass (g)) of air flowing into intake manifold 101 during each predetermined time period Δt by integration of throttle passage air quantity Qa. In this example; Qa [g]=Qa·Δt.

On the other hand, engine controller 32 calculates an actual cylinder volume Vc at an intake valve closing timing, in accordance with the closing timing IVC of intake valve 103, and multiplies the actual cylinder volume Vc by incylinder fresh air rate η, and engine speed NE (determined by motor speed NM of motor/generator 8). Then, by integrating the result of this calculation, engine controller 32 determines a final cylinder volume Vc=Vc·η·NE·Δt.

Then, for a manifold inside air balance calculation, engine controller 32 calculates a current manifold inside air quantity Cm$_n$ from a previous manifold inside air quantity Cm$_{n-1}$ which is a previous value of the manifold inside air quantity Cm, by addition of the manifold inflow air quantity Qa determined in the above-mentioned process, and subtraction of a manifold outflow air quantity Cc$_n$ which is a cylinder induction air quantity Qc of air flowing out of manifold 101 into cylinder section 102. In this calculation, engine controller 32 uses, as $Cc_n$, a previous value calculated in a previous execution of this routine. That is;

$$Cm_n = Cm_{n-1} + Qa - Cc_n \qquad (1)$$

Cylinder induction air quantity Qc (=incylinder air quantity Cc) is calculated from a cylinder volume Vc, by multiplication by manifold inside air quantity Cm and division by manifold volume Vm. That is;

$$Qc(=Cc) = Vc \cdot Cm/Vm \qquad (2)$$

This equation (2) is obtained as follows. Rearrangement of an equation of state of gas $P \cdot V = C \cdot R \cdot T$ provides $C = P \cdot V/(R \cdot T)$. Therefore, as to cylinder section 102; $Cc = Pc \cdot Vc/(R \cdot Tc)$. Assuming Pc=Pm and Tc=Tm, $$Cc = Pm \cdot Vc/(R \cdot Tm) \qquad (3)$$

On the other hand, rearrangement of the equation of state of gas $P \cdot V = C \cdot R \cdot T$ provides $P/(R \cdot T) = C/V$. Therefore, as to intake manifold 101;

$$Pm/(R \cdot Tm) = Cm/Vm \qquad (4)$$

Substitution of equation (4) into equation (3) yields;

$$Cc = Vc \cdot \{Pm/(R \cdot Tm)\} = Vc \cdot Cm/Vm$$

Thus, the equation (2) is obtained.

In this way, the control system according to this embodiment can determine the cylinder induction air quantity Qc. For the thus-determined cylinder section air quantity Qc, the control system sets a fuel injection quantity to achieve an optimum air-fuel ratio.

Engine 1 is stopped in the low vehicle speed region, as mentioned before. During an engine stopping operation for stopping engine 1, the balance calculation of manifold inside air quantity Cm is continued until the pressure in intake manifold 101 becomes equal to the atmospheric pressure, in order to use the manifold inside air quantity Cm calculated at the time when the pressure in intake manifold 101 becomes equal to the ambient pressure, as an initial value for calculating cylinder induction air quantity Qc for a next engine start.

Figure 3:
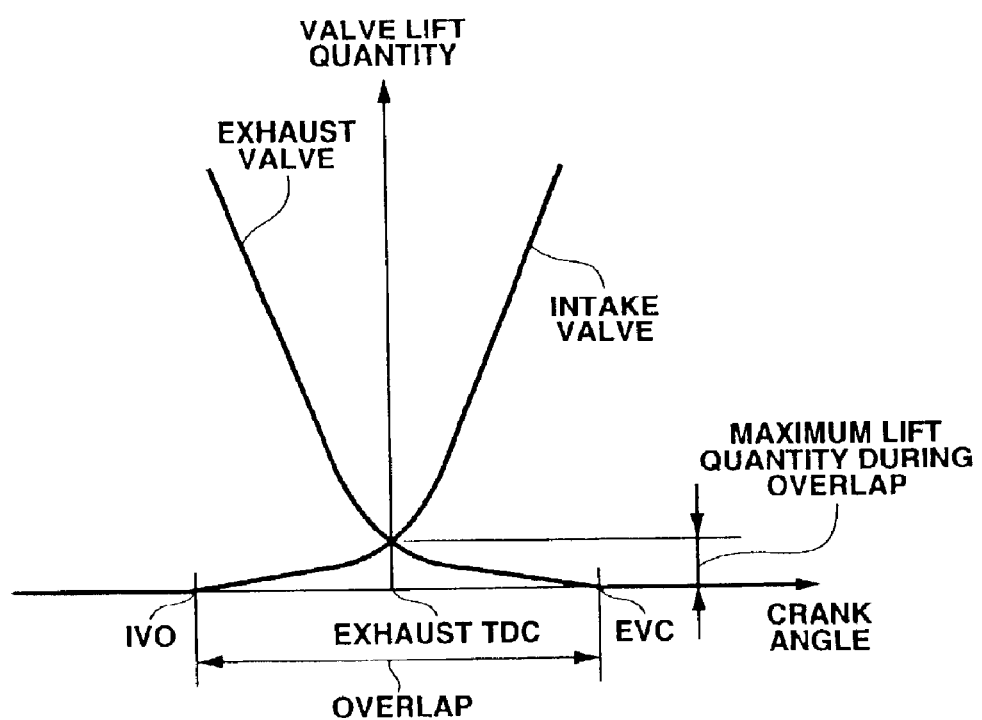
FIG. 3 is a graph for illustrating a valve overlap of the engine of FIG. 1.

The balance calculation of the manifold inside air quantity Cm during the engine stopping operation is performed in the following manner. As shown in FIG. 3, engine 1 of this embodiment is provided with a valve overlap (between the intake valve opening timing IVO and the exhaust valve closing timing EVC) during which intake valve 103 and exhaust valve 104 are both open in a TDC region around the exhaust top dead center. A maximum lift quantity Lmax during the overlap (maximum overlap lift quantity) is a maximum value of the smaller one of the valve lift quantity of intake valve 103 and the valve lift quantity of exhaust valve 104 during the overlap. In this case, the valve lift quantity of intake valve 103 is smaller than the valve lift quantity of exhaust valve 104 from IVO to the exhaust top dead center. The valve lift quantity of exhaust valve 104 is smaller than the valve lift quantity of intake valve 103 from the exhaust top dead center to EVC.

Figure 4:
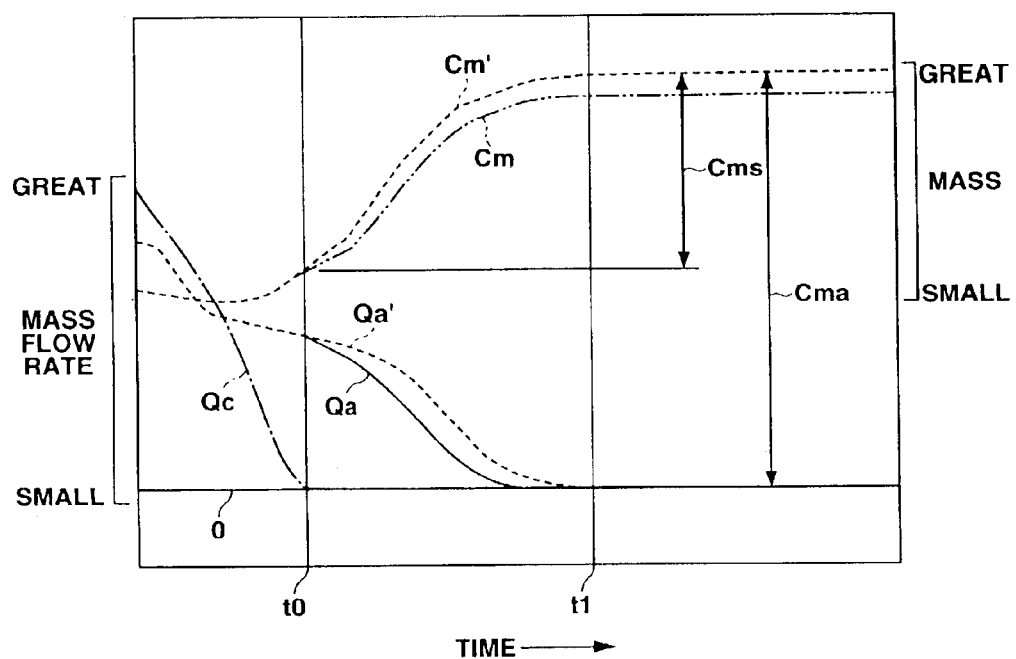
FIG. 4 is a graph showing influence on a manifold inflow air quantity Qa, a cylinder induction air quantity Qc and an intake manifold inside air quantity Cm, by gas flow into the intake side from the exhaust side during the valve overlap.

A stop position of engine 1 is determined by the balance between crank shaft torque in the forward direction and crank shaft torque in the reverse direction. Generally, a six-cylinder engine stops near a crank angle position of 60° before the top dead center on the compression stroke, and a four-cylinder engine stops near a crank angle position of 90° BTDC on the compression stroke. In some cases, however, engines may go through the standard stop position, and stop within the valve overlap period. In this case, air flows into intake manifold 101 from the exhaust system at the time of the balance calculation in the engine stopping operation. FIG. 4 shows time variation of manifold inflow air quantity Qa, cylinder induction air quantity Qc and manifold inside air quantity Cm in this situation.

When engine 1 stops within the overlap, air is drawn into intake manifold 101 from the exhaust side, too. Therefore, manifold inflow air quantity Qa calculated from the throttle passage air quantity (sensed by air flow meter 48) becomes smaller than an actual manifold inflow air quantity Qa' of air actually introduced into intake manifold 101. As a result, manifold inside air quantity Cm calculated from this manifold inflow air quantity Qa becomes smaller than an actual manifold inside air quantity Cm of air actually existing in intake manifold 101.

In an engine stopping process, throttle valve 105 is normally held at a small degree to sustain an idling operation. The accuracy of air flow meter 48, in general, decreases in a low flow rate region. Consequently, in the balance calculation of manifold inside air quantity Cm during the engine stopping operation, the sensing accuracy of the quantity of air passing through throttle valve 105 tends to become lower and cause errors in the calculation result.

Figure 5:
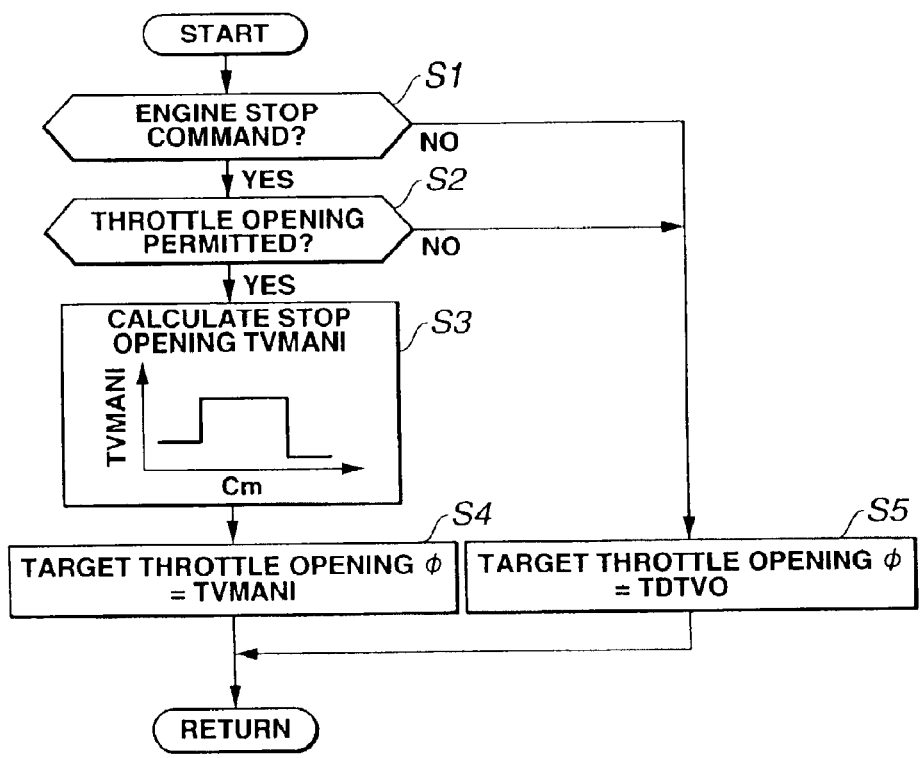
FIG. 5 is a flowchart showing an engine stopping control process in the embodiment.

FIG. 5 shows, in the form of a flowchart, an engine stopping control process according to this embodiment designed to meet the above-mention problem. The control process of FIG. 5 is executed by engine controller 32.

At S1 (step 1), engine controller 32 examines whether an engine stop command is issued or not. In this example, engine controller 32 determines that there is an engine stop command when the low speed running mode by motor/generator 2 is selected, or when the engine torque command from vehicle ECU 21 becomes equal to or lower than zero. Engine controller 32 proceeds from S1 to S2 when there is an engine stop command, and to S5 when it is judged that there is no engine stop command. The signal representing YES of S1 serves as a first condition signal.

At S2, engine controller 32 examines whether an increase of the opening of throttle valve 105 is permitted (a throttle opening permission is given) or not. In this example, step S2 examines a throttle opening permission flag F mentioned later with reference to FIGS. 8 and 9, and judges that the throttle opening permission is granted when throttle opening permission flag F is set to one. From S2, engine controller 32 proceeds to S3 when the throttle opening is permitted, and to S5 otherwise. The signal representing YES of S2 serves as a second condition signal.

Figure 6:
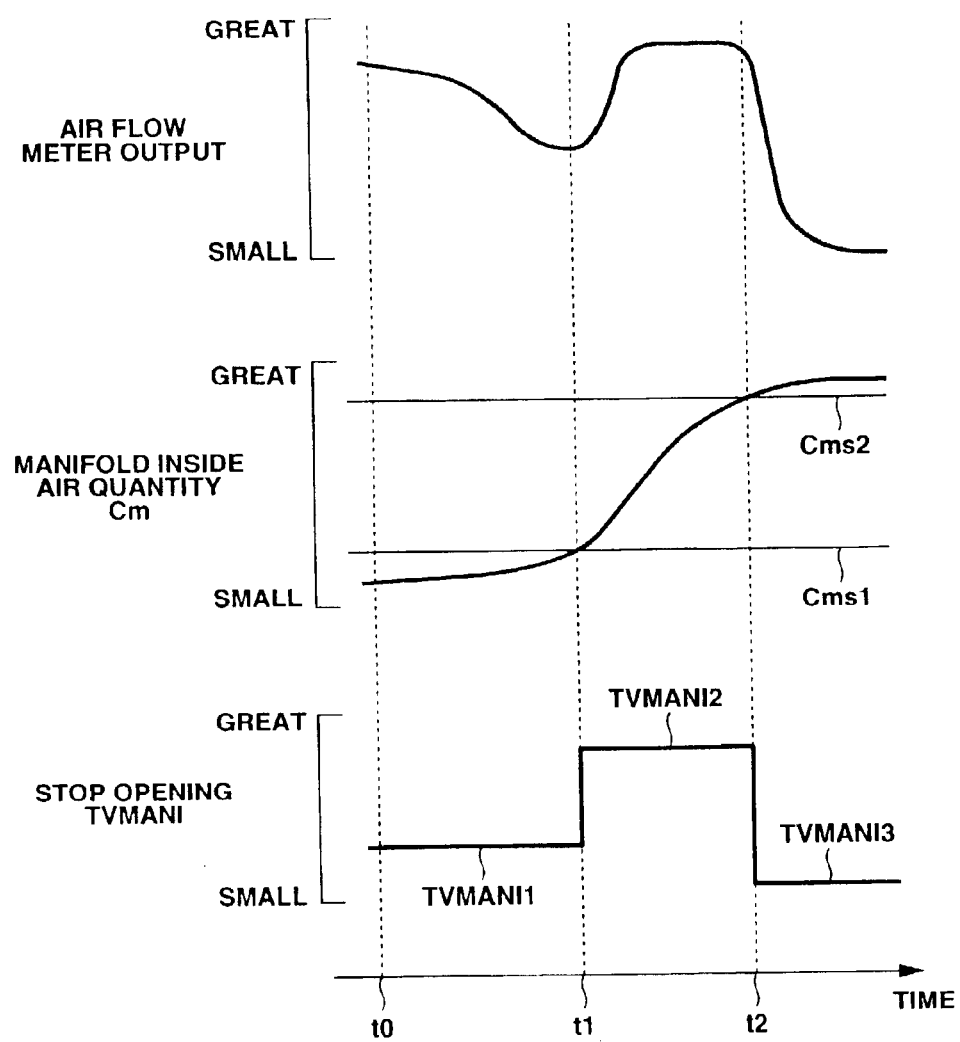
FIG. 6 is a view illustrating a table for setting an engine stop mode throttle opening in the embodiment.

At S3, engine controller 32 calculates a stop opening TVMANI of throttle valve 105 (or stop mode (or stop state) throttle opening). This stop mode throttle opening TVMANI is an opening degree of throttle valve 105 set specifically in the engine stopping process. In this example, stop mode throttle opening TVMANI is determined in accordance with the throttle passage air quantity (the output of air flow meter 48) in the following manner, as shown in FIG. 6.

First, by calculating the manifold inside air quantity Cm by the balance calculation based on the output of air flow-meter 48, and using the thus-determined manifold inside air quantity Cm as an alternative characteristic for changes in the throttle passage air quantity, controller 32 determines a value of stop state throttle opening TVMANI in accordance with a current value of manifold inside air quantity Cm, from a table. In the example of FIG. 6, stop mode throttle opening TVMANI is set to a predetermined value TVMANI1 (TVMANI=TVMANI1)(in this example, the throttle opening before the grant of the throttle opening permission is maintained) from an instant t0 at which a throttle valve opening permission is granted, to an instant t1 at which manifold inside air quantity Cm reaches a predetermined value Cms1. After manifold inside air quantity Cm becomes greater than or equal to Cms1 until an instant t2 at which Cm reaches Cms2 (Cms1<Cms2), stop mode throttle opening TVMANI is set to a predetermined value TVMANI2 (TVMANI=TVMANI2). In the example of FIG. 6, TVMANI2 is greater than TVMANI1. When Cm is greater than or equal to Cms2, stop mode throttle opening TVMANI is set to a predetermined value TVMANI3 (TVMANI=TVMANI3) corresponding to a fully closed opening degree. In the example of FIG. 6, TVMANI3 is smaller than TVMANI1.

Second predetermined value TVMANI2 is determined in accordance with a contribution ratio P (=Cms/Cma) in the following manner. Contribution ratio P is a ratio Cms/Cma of an air quantity Cms of air introduced into intake manifold 101 from a grant of the throttle valve opening permission (from the time when throttle valve 105 is set to the opening degree TVMANI2) until the pressure in intake manifold 101 becomes equal to the atmospheric pressure (as shown in FIG. 4), to a total air quantity Cma in intake manifold 101.

Figure 7:
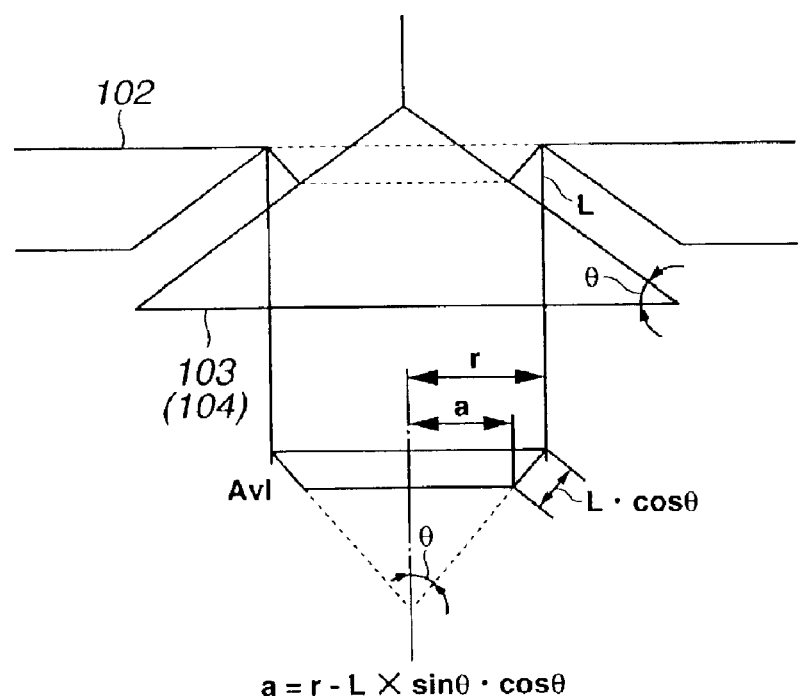
FIG. 7 is a view for illustrating a calculation of a port opening area, used in the embodiment.

A port opening area Av1 of intake or exhaust valve 103 or 104 can be determined from a valve lift quantity L of the valve 103 or 104, as shown in FIG. 7, by using a following equation (5).

$$Av1 = \sqrt{2} \times \pi \times (r^2 - a^2) \quad (5)$$

$$a = r - L \times \sin\theta \cdot \cos\theta$$

The thus-determined port opening area Av1 is multiplied by the number n of the intake or exhaust valves 103 or 104 (In this example, there are two intake valves and two exhaust valves, and the number n is two). That is; Av1=n×Av1.

The smaller one of the port opening area of the intake side and the port opening area of the exhaust side is selected and set anew as Av1. From the thus-determined port opening area Av1, the above-mentioned contribution ratio P, and an error E, a throttle opening area Ath is determined by using an equation (6). Stop mode opening degree $TVMANI_2$ is set equal to an opening degree of throttle valve 105 to achieve the thus-determined determined Ath. In this example, Av1 in equation (6) is the maximum value. However, the maximum value of Av1 is not necessarily obtained when L=Lmax. The maximum of Av1 is dependent on the diameters of the intake and exhaust valves 103 and 104, and the number n of the valves.

$$Ath = (P/E - 1) \times Av1 \quad (6)$$

$$E = Av1/(Av1 + Ath) \times P$$

Error E can be set at a desired value. Preferably, error E is set to such a value as to obtain Cm to set the air-fuel ratio within a predetermined allowable range by the fuel injection quantity calculated in accordance with manifold inside air quantity Cm in a next start.

Reverting to FIG. 5, at S4, engine controller 32 sets a target throttle opening φ to stop mode opening TVMANI. On the other hand, target throttle opening φ is set to a normal mode opening degree TDTVO at S5 when engine 1 is in operation, or when a throttle valve opening permission is not yet given in spite of generation of a stop command.

By increasing the opening degree of throttle valve 105 from the opening degree corresponding to the idling operation, by a predetermined degree in the engine stopping operation in this way, the control system of this embodiment increases the flow rate of air passing through throttle valve 105, and thereby maintain the sensing accuracy of air flowmeter 48 to calculate manifold inside air quantity Cm accurately. Moreover, the air resistance at the throttle is reduced, and the quantity of air inflowing through throttle valve 105 into intake manifold 101 is increased. Therefore, this control system can decrease the quantity of air introduced from the exhaust side relatively, and mitigate undesired influence by the backflow component from the exhaust side on the calculation of manifold inside air quantity Cm.

This control system opens throttle valve 105 in accordance with increase of manifold inside air quantity Cm, instead of opening the valve abruptly in response to a throttle valve opening permission. Therefore, this control system can reduce noise (induction noise) caused by flows around throttle valve 105 in abrupt changes in the flow rate through throttle valve 105. In the illustrated example, the stop mode throttle opening TVMANI is set in accordance with manifold inside air quantity Cm employed as a substitute for the throttle passage air quantity. However, it is possible to determine the stop mode throttle opening TVMANI in accordance with the throttle passage air quantity or some other operating parameter, such as the intake pressure PB, varied in relation to the throttle passage air quantity like manifold inside air quantity Cm, and thereby to reduce the induction noise.

In the above-mentioned example, stop mode throttle opening TVMANI is a variable. However, it is optional to use a fixed value as TVMANI. In this case, it is possible to set stop mode throttle opening TVMANI equal to a value determined by equation (6) with an appropriate value of error E. Alternatively, it is possible to use a fixed value with respect to a crank angle at which engine 1 is stopped, and to set TVMANI so as to vary in accordance with an actual port opening area Av1 at an engine stoppage.

In another example, stop state opening TVMANI is so set that throttle opening area Ath becomes greater than port opening area Av1. In this case, too, the system can provide desirable effect.

In this embodiment, the control system is arranged to open throttle valve 105 indiscriminately to a predetermined degree when there are produced an engine stop command and a throttle valve opening permission, in order to protect the accuracy of air flowmeter 48 from being decreased not only by a reverse flow of air from the exhaust side but also by various other factors. However, specifically to mitigate undesired influence of the reverse flow from the exhaust side, it is optional to open throttle valve 105 only when engine 1 is stopped at a position within a valve overlap period of the engine. In this case, in addition to the decision steps S1 and S2, there is further provided a step of examining whether engine 1 is stopped within the overlap period, by examining a sensed crank angle, for example. Throttle valve 105 is opened only when the first condition of S1, the second condition of S2 and the third condition of the additional step of the valve overlap are all satisfied.

Figure 8:
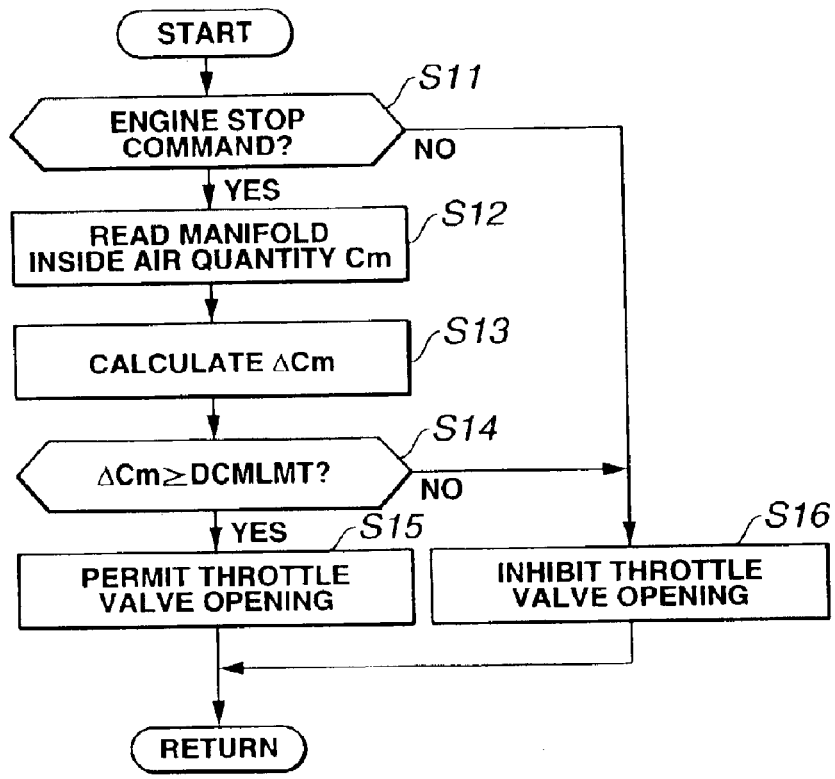
FIG. 8 is a flowchart showing a routine, in a first example of the embodiment, for producing a throttle opening permission.

FIG. 8 shows a routine of this embodiment for producing a throttle valve opening permission (and setting or resetting the flag F read at S2 of FIG. 5).

At S11, engine controller 32 examines whether an engine stop command is issued or not. This decision step can be performed in the same manner as in step S1. In the case of existence of an engine stop command, engine controller 32 proceeds to S12. Otherwise, controller 32 proceeds to S16.

At S12, controller 32 reads manifold inside air quantity Cm calculated by the balance calculation based on the throttle valve passage air quantity. At 513, controller 32 calculates a variation $\Delta Cm$ of manifold inside air quantity Cm. The variation $\Delta Cm$ in this example is a rate of change $\{\Delta Cm=(Cm_n-Cm_{n-1})/T\}$ per one control cycle ($Cm_n$ is a current value of manifold inside air quantity Cm, $Cm_{n-1}$ is a previous value of manifold inside air quantity determined in a previous cycle, and T is a cycle time of execution of this routine).

At S14, controller 32 examines whether the calculated variation (rate of change) $\Delta Cm$ of the manifold inside air quantity Cm is equal to or greater than a predetermined value DCMLMT. This value DCMLMT is an estimated value of the variation to be obtained when engine 1 is stopped. When $\Delta Cm$ is equal to or greater than DCMLMT, then controller 32 assumes that engine 1 is brought to a stop, and proceeds to 515. When $\Delta Cm$ is smaller than DCMLMT, controller 32 assumes that engine 1 is still revolving, and proceeds to S16.

Controller 32 sets the throttle valve opening permission flag F to one at S15 to permit the opening operation of throttle valve 105, and resets throttle valve opening permission flag F to zero at S16 to inhibit the opening operation of throttle valve 105 or to set throttle valve 105 to the normal mode opening degree.

By issuing the throttle valve opening permission after a stop of engine 1 in this way, this control system prevents throttle valve 105 from being opened before an engine stoppage and thereby prevents the induction of a large amount of air into cylinder section 102 which would cause a swing back (or reverse revolution) of the engine crank shaft by an increase of compression reaction force, and an increase of vibrations during the stoppage of engine 1.

The decision is made in accordance with manifold inside air quantity Cm, so that this embodiment requires no special additional equipment. However, it is possible to employ a pressure sensor for sensing the intake pressure PB for this decision. In this case, the pressure sensor is provided in the intake passage (in the wall of intake manifold 101). Controller 32 compares a variation $\Delta PB$ of intake pressure PB which is a rate of change per one control cycle, with a predetermined value, and produces the throttle valve opening permission when $\Delta PB$ becomes greater than the predetermined value. In this case, the timing to increase the throttle opening is determined in accordance with the variation of intake manifold pressure PB.

Figure 9:
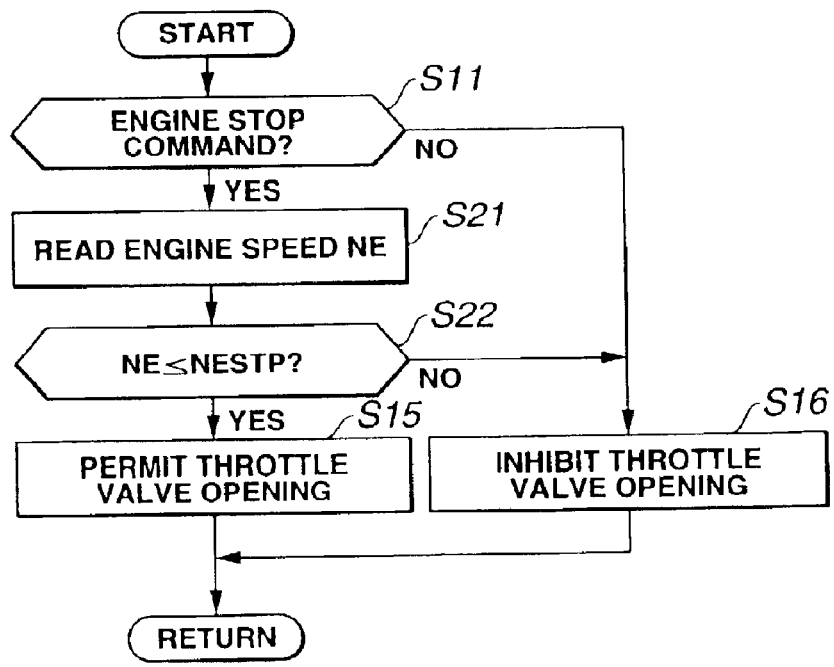
FIG. 9 is a flowchart showing a routine, in a second example of the embodiment, for producing a throttle opening permission.

In the example of FIG. 8, throttle valve 105 is opened after an engine stop. FIG. 9 shows another example arranged to open throttle valve 105 when the engine speed becomes low before an engine stop. Steps S11, S15 and S16 are substantially identical to corresponding steps in FIG. 8, and repetitive explanations are omitted.

When the generation of an engine stop command is confirmed at 511, controller 32 reads engine speed NE at S21 following S11. In this example, engine speed NE is determined by motor speed NM of motor/generator 8. At S22 following S21, controller 32 compares engine speed NM with a predetermined speed value NESTP to examine whether engine 1 is decelerated into a predetermined low speed region (including a stop state). When engine speed NE is lower than or equal to NESTP, then controller 32 proceeds to S15. When Ne is still higher than NESTP, controller 32 proceeds to S16.

When the predetermined speed value NESTP at S22 is set equal to zero to permit the opening of throttle valve 105 at the time of engine stoppage, it is desirable to employ an accurate engine speed sensing system capable of sensing engine speed NE accurately up to 0 [rpm], or capable of sensing engine speed NE accurately even in a very low speed region. This example employs an engine speed sensing apparatus disclosed in Japanese Patent Application No. 2001-058579 (published on Sep. 11, 2002, Kokai No. 2002-257841).

This engine speed sensing apparatus is arranged to calculates a first engine speed NE1 in accordance with a crank angle reference position signal REF. Moreover, this engine speed sensing apparatus calculates a second engine speed NE2 in accordance with an elapsed time from occurrence of a REF signal and an interval between two successive REF signals. This apparatus compares the first and second engine speeds NE1 and NE2 with each other, and sets the final engine speed NE equal to a lower one of the first and second engine speeds NE1 and NE2. In this way, the system can detect an stoppage of engine 1 accurately. The disclosure of Published Japanese Patent Application Kokai No. 2002-257841 is herein incorporated by reference.

In the above-mentioned example, an engine stop command is produced when the low speed running operation by motor/generator 2 is selected. However, an engine stop command is generated at various other timings according to the control system to which the present invention is applied, and the engine induction air quantity measuring apparatus according to the present invention can respond to these various engine stop commands. For example, it is possible to regard, as an engine stop command, a turn-off of the ignition switch, or a decision of an idle stop (when, for example, an idle switch turns on and the vehicle speed at that time is equal to or lower than a predetermined speed value). The engine stop includes a temporary idle stop. When such an engine stop command is produced, the cylinder induction air quantity measuring apparatus determines the final manifold inside air quantity by continuing the balance calculation until the predetermined final condition is reached (in the illustrated example, until the pressure in the intake manifold becomes equal to the atmospheric pressure), and uses the thus-determined final value, to calculate cylinder induction air quantity Qc in a next start of the engine.

In the illustrate embodiment of the invention, the controller section (32 etc) is programmed to calculate the intake manifold inside air quantity of air in the intake manifold of the engine, from the sensed intake air quantity by the balance calculation, and to calculate the cylinder induction air quantity of air inducted into the cylinder section in accordance with the intake manifold inside air quantity. The controller is further programmed to control the throttle opening of the throttle valve in the stop control mode to increase the throttle opening to a level greater than the level of the idling mode, in the engine stopping process to stop the engine. Therefore, the cylinder induction air quantity measuring apparatus can sense the cylinder induction air quantity accurately, and thereby prevent an increase of unwanted emissions and deficiency of torque in a next start of the engine.

In the case of an engine provided with a valve overlap, the cylinder induction air quantity measuring apparatus according to the embodiment can improve the accuracy of the measurement by increasing the quantity of air introduced from the intake side as compared to the quantity of air introduced into the intake manifold from the exhaust side even when the engine is stopped at a position within the valve overlap. Furthermore, the measuring apparatus can set the stop mode throttle opening degree, in the case of an engine stop within the valve overlap, to a degree determined in accordance with a maximum air quantity of air drawn into an intake manifold of the engine from the exhaust side during the valve overlap, and thereby improve the accuracy of the measurement.

In the example of FIG. 5, step S1 corresponds to a stop command checking section to produce a first condition signal when a predetermined vehicle condition to stop the engine is satisfied. Step s2 corresponds to a condition discriminating section to produce a second condition signal when a predetermined engine operating condition to permit a stop mode throttle control is satisfied. Step S5 corresponds to a normal mode throttle setting section to control the throttle opening of the throttle valve to a normal mode opening when at least one of the first and second condition signals is absent. Step S3 and S4 correspond to a stop mode throttle determining section to control the throttle opening of the throttle valve to the stop mode opening when both of the first and second condition signals are present. Step S3 corresponds to a varying section to determine a degree of the stop mode throttle opening in accordance with a parameter representing an air flow rate through the throttle valve, and step S4 corresponds to a setting section to set the target throttle opening of the stop mode throttle control equal to the degree of the stop mode throttle opening determined by the varying section.

This application is based on a prior Japanese Patent Application No. 2002-010289 filed in Japan on Jan. 18, 2002. The entire contents of the prior Japanese Patent Application No. 2002-010289 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An engine cylinder induction air quantity measuring apparatus for an engine provided with a throttle valve controlled independently from driver's accelerator operation, the engine cylinder induction air quantity measuring apparatus comprising:
   an intake air quantity sensing section to sense an intake air quantity of air drawn into an intake system of the engine;
   an intake manifold inside air quantity calculating section to calculate an intake manifold inside air quantity of air in an intake manifold of the engine, from the intake air quantity by performing a balance calculation to calculate a balance between an intake manifold inflow air quantity of air flowing into the intake manifold, and an intake manifold outflow air quantity of air flowing out of the intake manifold;
   a cylinder induction air quantity calculating section to calculate a cylinder induction air quantity of air inducted into a cylinder section of the engine in accordance with the intake manifold inside air quantity; and
   an engine stop mode throttle controlling section to control a throttle opening of the throttle valve to a predetermined stop mode opening greater than an idling mode opening for an idle operation of the engine, in an engine stopping process to stop the engine.

2. The engine cylinder induction air quantity measuring apparatus as claimed in claim 1, wherein the engine cylinder induction air quantity measuring apparatus is for the engine which is provided with a valve overlap; and wherein when the engine is stopped at a position within the valve overlap, the engine stop mode throttle controlling section controls the throttle opening of the throttle valve to the stop mode opening setting a throttle opening area of a throttle section, to a value greater than a smaller one of an intake port opening area on an intake side of the engine and an exhaust port opening area on an exhaust side of the engine.

3. The engine cylinder induction air quantity measuring apparatus as claimed in claim 2, wherein the engine stop mode throttle controlling section is configured to set the stop mode opening in the case of an engine stop within the valve overlap, to a degree determined in accordance with a total air quantity of air flowing into the intake manifold of the engine after the engine stop.

4. The engine cylinder induction air quantity measuring apparatus as claimed in claim 2, wherein the engine stop mode throttle controlling section is configured to set the stop mode opening in the case of an engine stop within the valve overlap, to a degree determined in accordance with a maximum value of the port opening area of the smaller one during the valve overlap.

5. The engine cylinder induction air quantity measuring apparatus as claimed in claim 1, wherein the engine stop mode throttle controlling section is configured to initiate the control of the throttle opening to the engine stop mode opening after a stop of the engine.

6. The engine cylinder induction air quantity measuring apparatus as claimed in claim 1, wherein the engine stop mode throttle controlling section is configured to initiate the control of the throttle opening to the engine stop mode opening at a timing determined in accordance with an engine speed of the engine.

7. The engine cylinder induction air quantity measuring apparatus as claimed in claim 1, wherein the engine stop mode throttle controlling section is configured to initiate the control of the throttle opening to the engine stop mode opening at a timing determined in accordance with a variation of an intake manifold pressure in the intake manifold.

8. The engine cylinder induction air quantity measuring apparatus as claimed in claim 1, wherein the engine stop mode throttle controlling section is configured to initiate the control of the throttle opening to the engine stop mode opening at a timing determined in accordance with a variation of the manifold inside air quantity calculated by the manifold inside air quantity calculating section.

9. The engine cylinder induction air quantity measuring apparatus as claimed in claim 1, wherein the engine stop mode throttle controlling section is configured to increase the throttle opening toward the stop mode throttle opening in accordance with a parameter representing a throttle passage air quantity of air passing through the throttle valve.

10. The engine cylinder induction air quantity measuring apparatus as claimed in claim 9, wherein the engine stop mode throttle controlling section is configured to increase the throttle opening toward the stop mode throttle opening in accordance with an increase in the manifold inside air quantity.

11. The engine cylinder induction air quantity measuring apparatus as claimed in claim 9, wherein the engine stop mode throttle controlling section is configured to increase the throttle opening toward the stop mode throttle opening in accordance with an increase in the throttle passage air quantity.

12. The engine cylinder induction air quantity measuring apparatus as claimed in claim 1, wherein the engine stop mode throttle controlling section comprises:
   a stop command checking section to produce a first condition signal when a predetermined vehicle condition to stop the engine is satisfied;

a condition discriminating section to produce a second condition signal when a predetermined engine operating condition to permit a stop mode throttle control is satisfied;

a normal mode throttle setting section to control a throttle opening of the throttle valve to a normal mode opening when at least one of the first and second condition signals is absent; and a stop mode throttle determining section to control the throttle opening of the throttle valve to the stop mode opening when both of the first and second condition signals are present.

13. The engine cylinder induction air quantity measuring apparatus as claimed in claim 12, wherein the stop mode throttle determining section comprises a varying section to determine a degree of the stop mode throttle opening in accordance with a parameter representing an air flow rate through the throttle valve, and a setting section to set a target throttle opening of the stop mode throttle control equal to the degree of the stop mode throttle opening determined by the varying section.

14. The engine cylinder induction air quantity measuring apparatus as claimed in claim 1, wherein the intake manifold inside air quantity calculating section is configured to continue the balance calculation to determine a final air quantity after an engine stop command to stop the engine until a predetermined final condition is reached; and the engine stop mode throttle controlling section is configured to control the throttle opening of the throttle valve to the stop mode opening during the engine stopping process after the engine stop command.

15. An engine cylinder induction air quantity measuring process for an engine provided with a throttle valve controlled independently from driver's accelerator operation, the engine cylinder induction air quantity measuring process comprising:

calculating an intake manifold inside air quantity, from a sensed intake air quantity of an engine, by performing a balance calculation to calculate a balance between an intake manifold inflow air quantity, and an intake manifold outflow air quantity, and calculating a cylinder induction air quantity from the intake manifold inside air quantity; and controlling a throttle opening of the throttle valve to a predetermined stop mode opening greater than an idling mode opening for an idle operation of the engine, in an engine stopping process to stop the engine.

16. An engine cylinder induction air quantity measuring apparatus for an engine provided with a throttle valve controlled independently from driver's accelerator operation, the engine cylinder induction air quantity measuring apparatus comprising:

means for calculating an intake manifold inside air quantity by calculating a balance between an intake manifold inflow air quantity which is the mass of air flowing into an intake manifold of an engine and which is determined from an air flow rate sensed on an upstream side of the intake manifold, and an intake manifold outflow air quantity which is the mass of air flowing out of the intake manifold into a cylinder section of the engine, and calculating a cylinder induction air quantity from the intake manifold inside air quantity; and means for controlling a throttle opening of the throttle valve to a predetermined stop mode opening greater than an idling mode opening for an idle operation of the engine, in an engine stopping process to stop the engine.

* * * * *